United States Patent

[11] 3,630,747

| [72] | Inventors | George L. Lowe<br>Chicago;<br>Clarence E. Brucker, Oak Park, both of Ill. |
|---|---|---|
| [21] | Appl. No. | 775,936 |
| [22] | Filed | Nov. 14, 1968 |
| [45] | Patented | Dec. 28, 1971 |
| [73] | Assignee | American Home Products Corporation<br>New York, N.Y. |

[54] PROCESSING OF BRAZIL NUTS
5 Claims, No Drawings

[52] U.S. Cl............................................. 99/126, 99/215
[51] Int. Cl......................................... A23l 1/36
[50] Field of Search............................ 99/126, 211, 215, 216

[56] References Cited
UNITED STATES PATENTS

| 1,448,431 | 3/1923 | Castruccio | 99/126 |
|---|---|---|---|
| 1,664,334 | 3/1928 | Thompson | 99/126 X |
| 2,816,839 | 12/1957 | Rockland | 99/126 X |
| 3,005,719 | 10/1961 | Rockland | 99/126 X |

FOREIGN PATENTS

| 409,459 | 5/1934 | Great Britain | 99/126 |

OTHER REFERENCES

The Ice Cream Trade Journal, Vol. 33, No. 1, pg. 44 Jan 1937.

*Primary Examiner*—Frank W. Lutter
*Assistant Examiner*—Robert Halper
*Attorney*—Joseph M. Weigman

ABSTRACT: A double immersion process for preparing Brazil nuts for use in the manufacture of confections is described which results in reducing the micro-organisms present on the Brazil nuts, while simultaneously cleaning them and improving their appearance and organoleptic properties. The double immersion process consists of, first, immersing the Brazil nuts in water at a temperature of 200° to 212° Fahrenheit for about 1½ to 2 minutes and then immersing the Brazil nuts in a stream of heated air at a temperature of about 200° to 220° F. for about 2 to 10 minutes.

PROCESSING OF BRAZIL NUTS

This invention relates to a method of treating Brazil nuts and more particularly relates to a process for preparing Brazil nuts for use in the manufacture of confections. The process may be carried out in two immersion steps. In the first step the Brazil nuts are immersed in water for a short time at a high temperature. In the second step one hot, wet Brazil nuts are immersed in a stream of high temperature, dry air. The result is good physical cleaning and improvement of the organoleptic properties of the Brazil nuts as well as a reduction in the number of micro-organisms present.

Shelled Brazil nuts as commercially supplied are not sterile and have a residual fragments of shells and dirt adhering to them. The known procedures for sterilizing and physically cleaning Brazil nuts tend to lessen the flavor and appearance of the Brazil nuts. Processes which work well with other kinds of nuts have not been successful with Brazil nuts. For instance, Brazil nuts, as received, contain about 3 percent by weight of water, and many sterilizing processes result in undesirably large changes in moisture.

It is an object of the present invention to provide a method of preparing Brazil nuts for use in the manufacture of confections.

It is a further object of the present invention to provide a method of surface-pasteurizing and drying Brazil nuts which not only reduces the micro-organisms present, but also improves the physical appearance and flavor of the pasteurized nut.

The objects of the present invention may be achieved by immersing Brazil nuts in water at a temperature of about 200° to 212° F. for about 1½ to 2 minutes, and then immersing them in stream of dry air heated to a temperature of about 200° to 220° F. for about 2 to 10 minutes. The preferred process is carried out utilizing water at about 200° F. for one minute followed by drying for about 2 to 10 minutes utilizing dehydrated air at a temperature of about 212° F.

Typically, the Brazil nuts are a commercially available grade which may be described as "Midget grade, 160–180 count per pound," and contain about 3 percent by weight of moisture as received. Desirably, the Brazil nuts contain from 2.8 to 3.3 percent water by weight after treatment.

Desirably the micro-organism content is reduced to about 0 to 2,000 per gram after treatment. In the treated nuts there are no *E. coli* or Salmonella, and a maximum of 10 coliform and 2,000 other micro-organisms per gram.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

This example illustrates the pasteurization of Brazil nuts by three different methods.

A batch of Brazil nuts (Midget grade, 160–180 count per pound) was fumigated and then divided into four substantially equal amounts. A first sample of the batch was immersed in water at 200° F. for 1½ minutes. The nuts were removed from the water and allowed to drain for 3 minutes. A micro-organism analysis was then performed by making a standard plate count.

A second sample of the batch was immersed in vegetable oil at 200° F. for 1½ minutes. The nuts were then removed from the oil and allowed to drain for three minutes. A micro-organism analysis was then performed by making a standard plate count.

A third sample of the batch was immersed in air in a circulating oven utilizing dry air at 200° F. The nuts were removed and a micro-organism analysis was performed by making a standard plate count.

The fourth sample of the batch was retained as a control. A micro-organism analysis was performed on the control by making a standard plate count.

The results are shown in Table I where the Standard Plate Count is stated in micro-organisms per gram.

TABLE I

Pasteurization Results

| Sample | Treatment | Standard plate count |
|---|---|---|
| 1 | 200° F. water for 1½ minutes | 42 |
| 2 | 200° F. oil for 1½ minutes | 64 |
| 3 | 200° F. air for 1½ minutes | 1,000 |
| 4 | control | 1,300 |

It may be seen from Table I that both the oil and water immersion treatments are effective in greatly reducing the micro-organisms present in Brazil nuts.

EXAMPLE II

The following example illustrates the effect of various pasteurizing treatments on the organoleptic properties of Brazil nuts.

A taste preference test was carried out by the following procedure utilizing the samples 1, 2, 3, and 4 from Example I.

A statistically significant group of persons, selected for flavor sensitivity, tasted a member of each sample. Each person recorded his subjective evaluation by assigning the sample a position on a Hedonic scale of 1–9. The lowest number corresponded to "extremely poor," the highest to "excellent." The individual ratings were averaged to determine the rating for each sample.

The results are shown below in Table II.

TABLE II

Organoleptic Properties

| Sample | Treatment | Rating |
|---|---|---|
| 1 | 200° F. water for 1½ minutes | 6.3 |
| 2 | 200° F. oil for 1½ minutes | 6.7 |
| 3 | 200° F. air for 1½ minutes | 5.3 |
| 4 | control | 5.9 |

From Table II it may be seen that the water and oil-immersed nuts had improved organoleptic properties compared with control and air-immersed nuts.

An examination of the physical appearance of the nuts was also made. The physical cleaning of extraneous material from the water-pasteurized nuts was greater than by any other method. Also, the appearance of the water-pasteurized nuts was enhanced to the greatest degree. There was good physical cleaning of extraneous material from the oil-pasteurized nuts and their physical appearance was improved. The physical appearance of the air-immersed nuts was not improved.

Based on the results of Examples I and II the water immersion treatment was selected for further investigation.

Example III

The following example illustrates the drying of water-pasteurized Brazil nuts.

A batch of Brazil nuts was pasteurized by immersing it in 200° F. water for 1½ minutes as described in Example I. One sample of the batch was air-dried at room temperature (80° F.) on an open wire belt. A second sample of the batch was air-dried at room temperature on an open wire belt using a fan to impinge a stream of high velocity air directly upon the nuts. A third sample of the batch was loaded into a wire mesh basket and placed in a convection-air oven maintained at a 212° F. temperature by circulating hot, dry air having an initial relative humidity of about 40 percent at 750° F. The results are shown in Table III.

TABLE III.—DRYING METHODS

| Method of drying | Air temp., °F. | Drying time, minutes | Moisture content, percentage |
| --- | --- | --- | --- |
| I | | | |
| Air dried wire belt | 80 | 2 | 4.3 |
| | | 4 | 3.9 |
| | | 6 | 3.8 |
| | | 8 | 3.7 |
| | | 10 | 3.6 |
| Air dried (fan)-wire belt | 80 | 2 | 3.9 |
| | | 4 | 3.7 |
| | | 6 | 3.7 |
| | | 8 | 3.6 |
| | | 10 | 3.5 |
| Oven dried (convection) | 212 | 2 | 3.8 |
| | | 4 | 3.7 |
| | | 6 | 3.5 |
| | | 8 | 3.3 |
| | | 10 | 3.1 |

The following conclusions may be drawn from Table III. The Brazil nuts contained about 3 percent by weight of moisture as received. The method of air drying the nuts at room temperature does an adequate job if enough time is available. However, the original nut moisture content cannot be reached by this method because the original nut moisture content is usually lower than the moisture of the surrounding air.

Because of the original low moisture content of the Brazil nuts, air-drying without previous drying of the air, even with the use of a fan is not effective to dry the nuts to their original moisture content.

The method of circulating heated drying air across the Brazil nuts is most effective in lowering the moisture content of the Brazil nuts to their original content. This method is also fastest and prevents recontamination of the Brazil nuts.

The terms and expressions which have been employed are used as terms of description and not of limitation, and there is no intention in the use of such terms and expressions of excluding any equivalents of the features shown and described or portions hereof, but it is recognized that various modifications are possible within the scope of the invention claimed.

What is claimed is:

1. A method of physically cleaning Brazil nut meats, improving their taste, reducing the number of micro-organisms present and producing an final moisture content substantially equal to the initial moisture content comprising: A. Immersing the Brazil nut meats in water at a temperature between about 200° to 212° F. for about 1½ to 2 minutes; and thereafter B. Immersing the Brazil nut meats in a stream of air at a temperature of 200° to 220° F. for about 2 to 10 minutes;

2. A method as defined in claim 1 in which the water immersion step is carried out for about 1½ minutes in water at about 200° F.

3. A method as defined in claim 1 in which the air immersion step is carried out utilizing air at about 212° F.

4. A method as defined in claim 1 in which the micro-organism content is reduced to about 0 to 2,000 per gram.

5. A method as defined in claim 1 in which the final moisture content is about 2.8 to 3.3 percent by weight.

* * * * *